United States Patent
Kazmi et al.

(10) Patent No.: US 11,569,972 B2
(45) Date of Patent: Jan. 31, 2023

(54) METHOD OF DETERMINING A MODE OF OPERATION FOR A WIRELESS TERMINAL

(71) Applicant: TELEFONAKTIEBOLAGET LM ERICSSON (PUBL), Stockholm (SE)

(72) Inventors: Muhammad Kazmi, Stockholm (SE); Gabor Fodor, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/745,487

(22) PCT Filed: Aug. 12, 2015

(86) PCT No.: PCT/EP2015/068597
§ 371 (c)(1),
(2) Date: Jan. 17, 2018

(87) PCT Pub. No.: WO2017/025141
PCT Pub. Date: Feb. 16, 2017

(65) Prior Publication Data
US 2018/0212746 A1    Jul. 26, 2018

(51) Int. Cl.
*H04L 5/14* (2006.01)
*H04L 5/16* (2006.01)
(Continued)

(52) U.S. Cl.
CPC .......... *H04L 5/1438* (2013.01); *H04L 1/1812* (2013.01); *H04L 1/1825* (2013.01); *H04L 5/14* (2013.01); *H04L 5/16* (2013.01); *H04L 43/0823* (2013.01); *H04L 5/0055* (2013.01); *H04L 5/1469* (2013.01); *H04L 2001/0092* (2013.01)

(58) Field of Classification Search
None
See application file for complete search history.

(56) References Cited

U.S. PATENT DOCUMENTS

| | | | |
|---|---|---|---|
| 4,771,417 A | 9/1988 | Maxwell et al. | |
| 7,653,014 B2 * | 1/2010 | Costo | H04L 1/0002 370/282 |

(Continued)

FOREIGN PATENT DOCUMENTS

| | | |
|---|---|---|
| CN | 101940008 A | 1/2011 |
| CN | 104335654 A | 2/2015 |

(Continued)

OTHER PUBLICATIONS

International Search Report and Written Opinion, dated Apr. 18, 2016, from corresponding PCT Application No. PCT/EP2015/068597.

(Continued)

*Primary Examiner* — Gregory B Sefcheck
*Assistant Examiner* — Srinivasa R Reddivalam
(74) *Attorney, Agent, or Firm* — Christopher & Weisberg, P.A.

(57) ABSTRACT

A method of determining a mode of operation for a wireless terminal comprises determining a parameter indicating Hybrid Automatic Repeat Request, HARQ, re-transmissions in communications with the wireless terminal. The method further comprises determining a full duplex or half duplex mode of operation based on the parameter of HARQ re-transmissions.

16 Claims, 4 Drawing Sheets

(51) Int. Cl.
*H04L 1/18* (2006.01)
*H04L 43/0823* (2022.01)
*H04L 1/00* (2006.01)
*H04L 5/00* (2006.01)

(56) References Cited

U.S. PATENT DOCUMENTS

| | | | |
|---|---|---|---|
| 8,310,961 B2 | 11/2012 | Chindapol et al. | |
| 8,542,617 B2 | 9/2013 | Choi et al. | |
| 8,861,443 B2 | 10/2014 | Shirani-Mehr et al. | |
| 9,203,559 B2* | 12/2015 | Wang | H04W 72/04 |
| 2009/0296609 A1* | 12/2009 | Choi | H04W 72/121 |
| | | | 370/281 |
| 2009/0304109 A1* | 12/2009 | Kotecha | H04L 1/1893 |
| | | | 375/299 |
| 2011/0004797 A1* | 1/2011 | Gerstenberger | H04L 1/08 |
| | | | 714/748 |
| 2011/0125488 A1* | 5/2011 | Birmingham | H04L 1/0003 |
| | | | 704/201 |
| 2014/0334392 A1* | 11/2014 | Gage | H04L 5/0092 |
| | | | 370/329 |
| 2015/0009872 A1 | 1/2015 | Yang et al. | |
| 2015/0016318 A1* | 1/2015 | Lee | H04L 5/14 |
| | | | 370/280 |
| 2015/0172003 A1 | 6/2015 | Kim et al. | |
| 2016/0037322 A1* | 2/2016 | Nguyen | H04W 8/005 |
| | | | 370/329 |
| 2016/0173239 A1* | 6/2016 | Kim | H04L 1/1812 |
| | | | 370/329 |

FOREIGN PATENT DOCUMENTS

| | | |
|---|---|---|
| CN | 104380628 A | 2/2015 |
| CN | 104717760 A | 6/2015 |
| WO | 2010005951 A2 | 1/2010 |

OTHER PUBLICATIONS

Office Action in corresponding/related Chinese Application No. 201580082454.0 dated Apr. 28, 2020 (All references not cited herewith have been previously made of record.).

Search Report in corresponding/related Chinese Application No. 201580082454.0 dated Apr. 20, 2020 (All references not cited herewith have been previously made of record.).

Examination Report in corresponding/related India Application No. 201817001463 dated Mar. 13, 2020. (All references not cited herewith have been previously made of record.).

* cited by examiner

METHOD OF DETERMINING A MODE OF OPERATION FOR A WIRELESS TERMINAL

TECHNICAL FIELD

The present disclosure is related to a method of determining a mode of operation for a wireless terminal and an apparatus for determining a mode of operation for a wireless terminal. The mode of operation comprises a full duplex mode or a half duplex mode.

BACKGROUND

Figure 1:
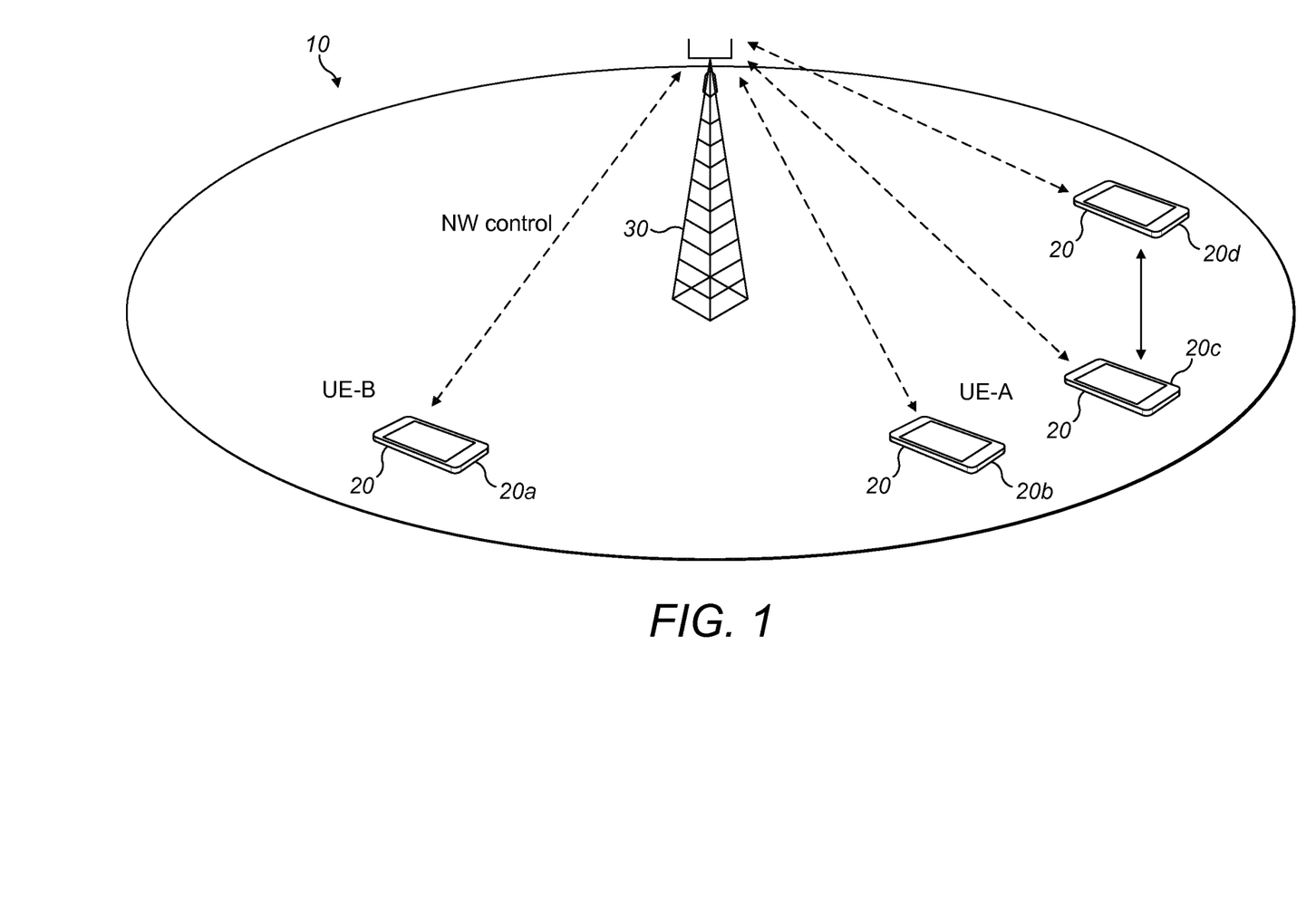
FIG. 1 shows an example of a radio access network according to the prior art.

FIG. 1 illustrates an example of wireless terminals 20 in communication with an access network 10. The access network comprises one or more network node 30. The wireless terminals 20 are configured to communicate with the network node 30 in cellular communication. At least two of the wireless terminals 20 are configured for Device-to-Device (D2D) communications, which allows each such wireless terminal to communicate with another device having compatible D2D communication capabilities. D2D communications may be network-assisted when one or both devices are operating within the coverage of the cellular network. In this example, wireless terminals 20a,20b are shown in cellular communication with the network node 30, and wireless terminals 20c,20d are in D2D communication.

The wireless terminal 20 may be termed a User Equipment (UE), following 3GPP terminology, or a wireless terminal. Non-limiting examples of wireless terminals 20 include wireless telephones, smart phones, tablets, portable computers, media players. It will be understood that an access network can serve a large number of terminals 20.

The network node 30 may be referred to as a base station. In 3GPP terminology, a base station is called a base transceiver station (BTS), NodeB (UMTS) or an eNodeB (LTE). Base stations configured for smaller coverage areas, such as femtocells, are called Home Node B (HNB) or Home eNodeB (HeNB). In a WLAN network, communication is between the terminal 20 and an access point (AP). The access network 10 may be connected to other network nodes, a core network and/or to an IP network, not shown for clarity.

Communication with a wireless access network may refer to communication with a cellular access network or communication with any other type of network node, e.g. an access point of a network node.

The access network 10 is a radio access network. The access network 10 may operate according to any radio access technology, for example, a radio access technology standardized by the 3rd-Generation Partnership Project (3GPP), including: Long-Term Evolution (LTE), Universal Mobile Telecommunications System (UMTS)/Wideband Code-Division Multiple Access (WCDMA), High Speed Packet Access (HSPA) and Global System for Mobile Communications (GSM). In some examples, the access network may be an Evolved Universal Terrestrial Radio Access Network (E-UTRAN). The radio access technology may be a non-3GPP radio access technology, such as WLAN (Wi-Fi) or WiMAX. WLAN technology is described in IEEE 802.11 standards. WiMAX is described in IEEE 802.16.

In some examples, the wireless access network communication (e.g. cellular) between two devices comprises communications are routed through a default path, which includes the core network of the supporting communication network. In this case, signaling between the two devices may be communicated through serving gateway (SGW)/packet gateway (PGW) nodes in the core network associated with the Radio Access Network (RAN) supporting the two UEs.

FIG. 1 illustrates an example of two wireless terminals 20c,20d using a "direct mode" of communication (D2D), based on the two devices being in relatively close proximity to one another. The wireless terminals 20c,20d communicate directly with each other, such that at least some communication or data does not pass through the network node 30.

Alternatively, a communication between the two devices may be a "locally-routed" communication, in which the signaling between the two devices is conveyed through a radio access network node such as serving base station, e.g. eNodeB in LTE. However, unlike conventional cellular communication signaling between two devices, the signaling is not routed through the default path, which includes the core network of the supporting cellular communication network. Such "locally routed" communication is considered to be an example of communication between devices via radio access network node, and is not considered as part of a conventional cellular or network communication.

In device-to-device communication, the source and the target are wireless terminals, e.g., UEs. Some of the potential advantages are offloading of traffic from the network, faster communication, increased awareness of surrounding wireless terminals of interest (e.g., running the same application), and higher-quality links due to a shorter distance.

Mode selection (MS) in network assisted device-to-device (D2D) communications is a technique to determine whether a pair of wireless terminals 20 in the proximity of each other should use a direct communication link (D2D) or communicate through a wireless access point or base station, i.e. communicate using the access communication. A mode selection scheme relies on UE and network node measurements to determine whether the D2D link or a pair of links with a network node (uplink and downlink) are more efficient depending on the current geometry, system load, wireless terminal capabilities and other factors.

D2D operation is the basic technology enabler for so called proximity services (ProSe). ProSe is a subject of 3GPP standardization for Release-13 LTE networks. The D2D discovery and D2D communications are two main variants of D2D operation. The D2D operation is also interchangeably termed as Proximity Service (ProSe) or more ProSe operation. Similarly D2D discovery and D2D communications are interchangeably called as ProSe discovery and ProSe communications respectively. The ProSe operation takes place on a radio link called a sidelink and corresponding resources are referred to as ProSe or sidelink resources.

A wireless terminal 20 is configured to communicate signals with the network node 30 or another device 20 in both directions. For example, the wireless terminal 20 is configured to transmit signals to the network node 30 (uplink signals) and receive signals from the network node 30 (downlink). Correspondingly, transmission signals may be transmitted to the other device 20 in D2D operation, and receive signals may be received from the other D2D device 20.

It is known for the wireless terminal 20 to be configured such that different direction signals (e.g. uplink and downlink) avoid interfering with each other, i.e. self-interference. For example, the wireless terminal 20 may operate using frequency division duplex (FDD), in which different direction signals are assigned different carrier (subcarrier) frequencies. A wireless terminal 20 may alternatively or in addition operate using time division duplex (TDD), in which different direction signals are assigned different times or time slots. The FDD and TDD modes are examples of half duplex schemes.

It is further known for a wireless terminal 20 to operate using full duplex. In full duplex (FD) communication, there is a simultaneous transmission and reception of radio signals on the same carrier frequency. In contrast, in a half duplex (HD) mode, the transmission and reception of radio signals do not take place simultaneously and on the same frequency.

Consequently, FD communication systems must manage the problem of self-interference (SI) such that the received signal from a transmitter can be decoded in the presence of the interference caused by the simultaneously transmitted signal. Obviously, the caused SI depends on the transmit power of the wireless terminal, the spatial separation of the transmitter and receiver entities, beamforming capabilities of the transmitter (e.g. of the network node), available channel state information and other factors.

A wireless terminal may use half duplex method (e.g. FDD or TDD) to provide a service which appears to a user as a full-duplex service. The user is not aware that different frequencies and/or time slots are used for uplink and downlink communication. However, such FDD or TDD schemes are not actually operating with the wireless terminal in a full duplex mode.

In a cellular system that supports proximity services (ProSe) by D2D communication, the wireless terminals may operate in different modes. There is a need to select a mode to operate effectively in this scenario.

SUMMARY

An aspect provides a method of determining a mode of operation for a wireless terminal comprises determining a parameter indicating Hybrid Automatic Repeat Request, HARQ, re-transmissions in communications with the wireless terminal. The method further comprises determining a full duplex or half duplex mode of operation based on the parameter of HARQ re-transmissions.

Thus, a determination of mode selection is efficiently made for communication with the wireless terminal.

Another aspect provides an apparatus configured to determine a mode of operation for a wireless terminal. The apparatus comprises a HARQ parameter unit configured to determine a parameter indicating Hybrid Automatic Repeat Request, HARQ, re-transmissions in communications with the wireless terminal. The apparatus further comprises a mode selection unit configured to determine a full duplex or half duplex mode of operation based on the parameter of HARQ re-transmissions.

Another aspect provides an apparatus configured to determine a mode of operation for a wireless terminal. The apparatus comprises a processing arrangement and a memory. Said memory containing instructions that when executed cause the apparatus to determine a parameter indicating Hybrid Automatic Repeat Request, HARQ, re-transmissions in communications with the wireless terminal, and determine a full duplex or half duplex mode of operation based on the parameter of HARQ re-transmissions Another aspect provides a computer program product comprising a machine-readable medium carrying instructions which, when executed by a processor, cause the processor to perform the method of any example.

BRIEF DESCRIPTION OF THE DRAWINGS

Embodiments of the invention will be described, by way of example only, with reference to the accompanying drawings in which.

DETAILED DESCRIPTION

Aspects of the disclosure relate to a selection of a mode of operation for a wireless terminal, which can communicate with a further terminal using a network node of a wireless access network or in a D2D communication. The mode selection relates to a selection of a full duplex or a half duplex mode. In some aspects, the mode selection further relates to a selection of a D2D or wireless access network communication. The mode selection is based on an indication of Hybrid automatic repeat request (HARQ) re-transmissions. The wireless terminals and wireless access network (e.g. cellular) of an example of the disclosure may be arranged as described in FIG. 1.

For example, full duplex capable devices 20 can advantageously use full duplex communication bearers in D2D mode. Alternatively, the wireless devices 20 can establish half duplex D2D bearers or use wireless access network (e.g. cellular) communication bearers through the base station. References below to cellular communication, network communication or access network communication are an example of wireless access network communication, and are also applicable to a WLAN or other network based communication.

Wireless communication systems use various packet retransmission strategies and signaling schemes to cope with transmission errors and time varying channel conditions. Automatic repeat request (ARQ) and Hybrid ARQ (HARQ) techniques use acknowledgments (ACK) and negative acknowledgments (NAK) signaling and stop-and-wait (SAW) processes between a transmit-receive pair to manage packet retransmissions and ensure high resource utilization.

HARQ schemes, for example, can operate in an asynchronous operation or a synchronous operation. For example, a LTE access network uses asynchronous operation in downlink (i.e. from network node to wireless terminal) and synchronous operation in uplink (i.e. from wireless terminal to network node). In synchronous HARQ, retransmissions occur at predefined time instants, whereas in asynchronous HARQ retransmissions can occur at any time and require signaling to associate retransmitted packets with the initial transmission.

Synchronous HARQ schemes reduce the signaling overhead while asynchronous HARQ schemes are more flexible in terms of scheduling options (e.g. when the retransmission should occur relative to the original transmission).

The HARQ scheme may further be categorized as adaptive or non-adaptive. In adaptive HARQ, the modulation and coding scheme and resource block may change according to resources allocated by the network node. In non-adaptive HARQ, retransmission occurs only in a predefined time after previous transmission/retransmission using the same resources. Adaptive schemes offer higher scheduling gain at the expense of some signaling overhead, as compared with non-adaptive schemes.

In some examples, asynchronous adaptive HARQ is used in the downlink, while synchronous adaptive or non-adaptive HARQ is used in the uplink. In HARQ, incremental redundancy, modulation and coding scheme (MCS) selection and timing may be supported. The HARQ transmit and receive operations is managed by a HARQ entity of the MAC layer.

An aspect of the present disclosure is the use of HARQ retransmissions to indicate the reliability and the quality of a wireless communication channel. Thus, HARQ retransmissions are exploited to determine whether FD mode or HD is the most suitable for a given communication link. The mode selection may further include determining a mode of wireless access network (e.g. cellular) communication or a D2D communication, based on HARQ retransmissions.

The HD mode may be a HD D2D operation mode or a HD wireless access network (e.g. cellular) communication mode. Similarly, the FD mode may be a FD D2D operation mode or a FD cellular communication mode. In some examples, these modes are combined with known geometry based mode selection techniques.

In conjunction with retransmission, a radio node (e.g. node containing or managing the HARQ entity) selects a communication mode in terms of FD D2D or FD cellular, HD D2D or HD cellular mode. The communication mode is based on HARQ performance, e.g. based on a parameter indicating HARQ re-transmissions. The parameter indicating re-transmissions may be based on an indication of number of HARQ retransmissions, e.g. a number of failures of HARQ retransmissions. The radio node which selects the communication mode may be the radio network node (e.g. base station, eNodeB), wireless terminal (e.g. UE) or another wireless terminal (i.e. in D2D communication with the wireless terminal), or a combination of wireless terminal and network node.

The method of an example of the disclosure selects the most suitable communication mode for proximity services in cellular networks, in which the communicating devices are full duplex capable. The mode selection exploits characteristics of the HARQ mechanism. The mode selection is able to automatically adapt the communication mode to the instantaneous characteristics of the wireless channel and the changing geometry of the system due to, for example, mobility, changing fading conditions or sudden shadowing.

The communication mode is ultimately controlled by the network node, the HARQ processes and thereby parts of the mode selection process is distributed, and thereby scalable to a large number of proximity devices. For example the wireless device may select the mode and recommend it to the network node, which in turn may eventually decide which mode to use.

In conjunction with retransmission, a radio node (e.g. node containing or managing the HARQ entity) based on HARQ performance reselects mode in terms of FD D2D or FD cellular, HD D2D or HD cellular mode. For example, when a HARQ performance parameter indicates low channel quality (e.g. HARQ retransmission fails N times for the same initial (first) transmission), the radio node switches from FD to HD mode. For example, when the HARQ performance parameter indicates high channel quality (e.g. HARQ retransmissions have not happened or the HARQ retransmissions have not exceed K times for the same initial (first) transmission), the radio node switches from HD to FD mode. In some examples, when a HARQ performance parameter indicates moderate channel quality (e.g. HARQ retransmissions between two thresholds), then either no mode switching is performed or a particular mode is selected by the radio node. These functions are described in detail below.

Figure 2:
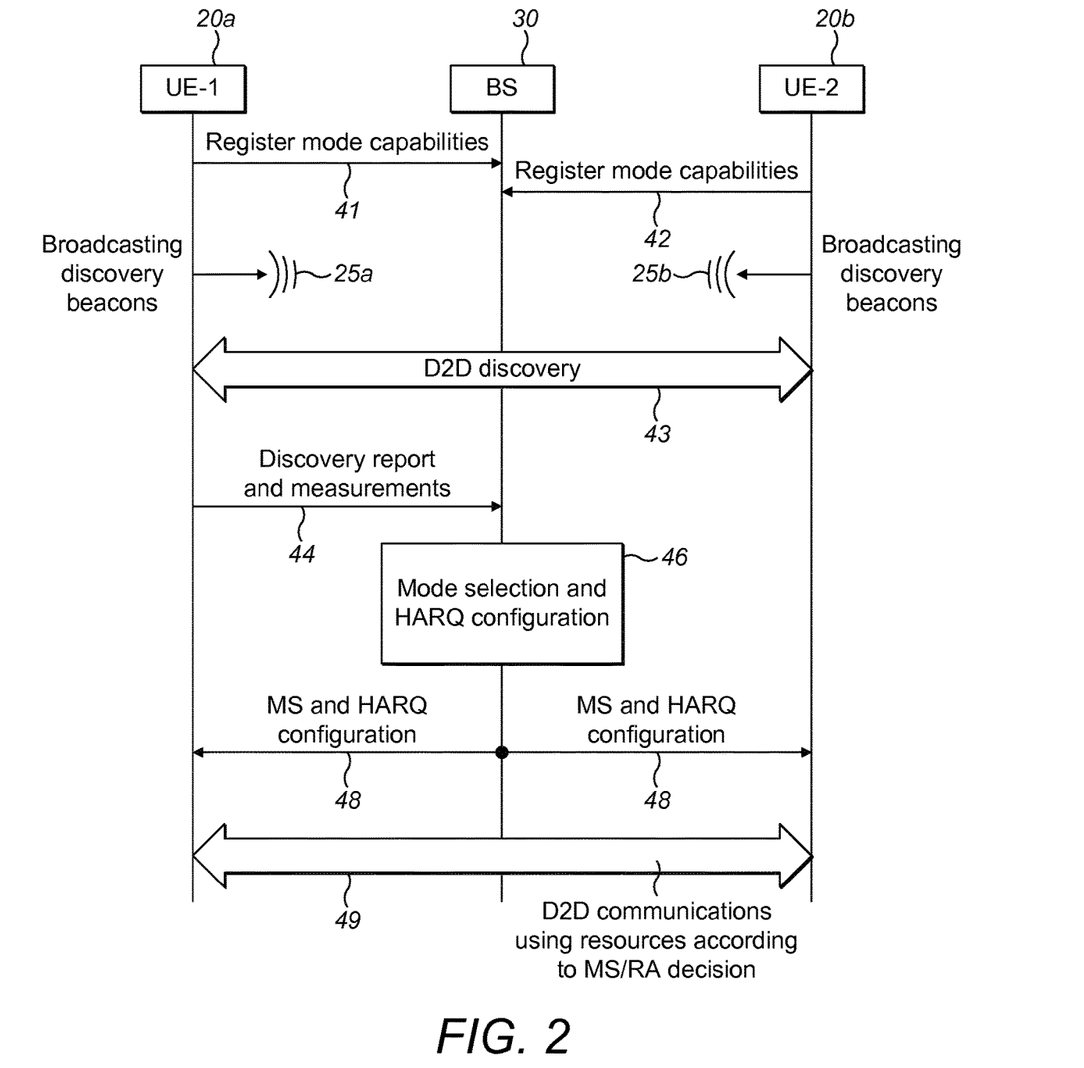
FIG. 2 shows an example of communications according to an aspect of the disclosure.

FIG. 2 shows signaling and processes for a default or initial mode selection and HARQ configuration, for nodes 20,30 in communication in the access network 10. For example, the first wireless terminals 20a, 20b and network node 30 are as described in FIG. 1.

In some examples, the initial mode selection resource allocation and HARQ configuration is performed by the cellular network node (e.g. base station). In some examples, this is based on measurements on discovery signals broadcast by the wireless terminals, as described below.

In an aspect of the disclosure, a first step in the mode selection and HARQ configuration process is a registration of mode capabilities of the wireless terminal at the radio node performing or determining the mode selection. In this registration, the wireless terminal capabilities are acquired by the radio node which is responsible for mode selection. In this example, the radio node is the base station 30. The first wireless terminal 20a (labelled UE-1) transmits its capability information 41 to the base station 30. The second wireless terminal 20b (labelled UE-2) transmits its capability information 42 to the base station 30. In some examples, the capability information 41,42 is capability information associated with the device-to-device mode or wireless access network communication mode, or FD or HD mode.

The first and/or second wireless terminal may optionally transmit discovery signals 25a, 25b, for example, synchronization signals, broadcast signals, beacon signals. The discovery signals 25a, 25b can be transmitted or broadcasted by any one or more of the wireless terminals.

The discovery signals 25a, 25b allow for discovery of the other wireless terminal, to initiate D2D communication between the first and second wireless terminals. The first and second wireless terminals communicate to exchange discovery information in one or more communication 43, e.g. service, capabilities and/or geometry. In some examples, a wireless terminal receiving a discovery signal carries out a measurement on the discovery signal. For example, a measurement of signal strength and/or signal-to-noise-and-interference is made.

The information indicating wireless terminal capability comprises at least one of: information associated with D2D communication modes and information associated with network (e.g. cellular) communication modes. The network communication mode is also interchangeably called a cellular communication mode, wireless access network (WAN) communication mode or radio access network (RAN) communication mode.

The information associated with D2D communication modes may comprise information indicating support of the wireless terminal for half duplex, e.g. half duplex FDD, half duplex TDD, full duplex, supported frequency bands for different modes, self-interference rejection capability for different modes and/or bands, maximum transmit power, and other wireless and duplexing scheme specific parameters (e.g. switching time between modes, transport format such as MCS supported for different modes).

The capability information may comprise the type of measurements that can be performed by the wireless terminal on the discovery signals 25a, 25b transmitted or broadcasted by other wireless terminals. In some examples, the capability information is capability information associated with the device-to-device mode or wireless access network communication mode, or FD or HD mode.

The information associated with cellular communication modes may comprise information indicating support of the wireless terminal for half duplex, e.g. half duplex FDD, half duplex TDD, full duplex, supported frequency bands for different cellular modes, self-interference rejection capability, maximum transmit power and other wireless and duplexing scheme specific parameters (e.g. switching time between modes, transport format such as MCS supported for different modes).

The wireless terminals are configured to report the discovery results and measurements to the network node. In the example shown, the first wireless terminal 20a transmits such a discovery results and/or measurements report 44 to the network node. The discovery report 44 may comprise measurements made on the discovery signals, e.g. from another wireless terminal. The second wireless terminal 20b may also transmit such a report (not shown). For example, the wireless terminal 20b can also transmit a report assuming both the wireless terminals are measuring each other's discovery signals. In some examples, one of the wireless terminals transmits a discovery signal, whereas other wireless terminals measure the discovery signals as they want to discover such a wireless terminal.

At the start of the session or at the start after inactivity period of the ongoing session, the radio network node performing or assisting the mode selection does not have information to determine the mode selection, e.g. statistics about the HARQ feedback, as described in more detail below. In this case the radio network node selects a suitable mode depending on the wireless terminal capabilities, e.g. in terms of supported modes.

In aspects of the disclosure the wireless terminal is configured with a default HARQ operation mode. The default HARQ operation mode may be used initially. This may occur at the start of the session or after an inactivity period of the ongoing session.

In an example, a default HARQ operation mode for FD mode (e.g. FD D2D) is synchronous HARQ. The HARQ operation mode may be adaptive or non-adaptive. FD D2D may use uplink spectrum, and this synchronous HARQ mode is suitable for FD D2D mode of operation. For example, the radio network node also selects the maximum number of HARQ retransmissions when configuring the wireless terminals with the initial or default mode.

In some aspects, the radio node configures an initial or default operating mode and associated HARQ initial or default HARQ configuration based on the received discovery results and measurements report 44 from the first wireless terminal. The mode selection and/or HARQ configuration is based on the reported measurement results and/or depending on how the network node is configured.

For example, the default mode between the first and second wireless terminals may be configured to be a half duplex network (e.g. cellular) communication. However, this default mode can be overridden to, for example, half or full duplex D2D mode depending on an explicit wireless terminal request and/or wireless terminal capabilities. The D2D mode may be use for communication between the first and second wireless terminals if the reported path gain between the first and second and second wireless terminals exceeds a preconfigured threshold value.

In some aspects, the initial or default mode selection may be determined in 46 by the radio node according to one or more of: a particular default or pre-defined mode, an initial mode selection based on radio measurements and/or an initial mode selection based on specific UE capability. These examples are now described in more detail below.

In the case of selection 46 an initial mode according to using a default or pre-defined mode, a particular mode is always used initially, or after long inactivity, or whenever there is insufficient HARQ feedback statistics. For example, the radio node may always use HD mode initially as a default. In other words, it applies a conservative approach to ensure that the session is correctly initiated with the least errors. In a further example, the radio node may always use FD mode initially as a default. In other words, it applies an aggressive approach (allowing higher data rate) with the assumption that subsequently the HD mode can be used if HARQ retransmissions above a threshold level are subsequently detected.

In the case of initial mode selection 46 based on radio measurements, the radio node performing mode selection uses one or more radio measurements to select the initial mode. In some examples, the radio node performing the mode selection is the network node, or may alternatively be the wireless terminal. The radio measurements may be performed by the wireless terminal. In some examples, the radio measurements are alternatively or additionally performed by the base station. The radio measurements may be performed by the wireless terminal on D2D signals and/or cellular signals depending on the wireless terminal mode capabilities, as described above.

The D2D wireless terminals may use existing techniques to detect discovery signals (e.g. beacons) and report such discoveries to the radio node (e.g. serving base station), along with measurement results (e.g. received discovery beacon signal strength or measured discovery signal signal-to-noise-and-interference (SINR)) on such beacons. For example, reporting the received signal strength of discovery signals allows the network node to estimate the path loss between wireless terminals which discovered one another.

This estimation provides for the network node to select communication mode for the devices. For example, if the measured/reported path loss between the devices is lower than a predefined threshold and both wireless terminals are FD capable, the radio node selects FD mode and allocates dedicated radio resources for the wireless terminal pair. Alternatively or in addition, if the measured/reported discovery SINR at the devices with respect to each other exceeds a predefined threshold and the reported/registered self-interference suppression capability of both devices exceeds a predefined capability, the radio node (e.g. base station) selects FD mode and allocates dedicated radio resources for the wireless terminal pair. This example is related to the D2D communication mode.

If the measured/reported path loss is above a first threshold but is under a second threshold, and both wireless terminals are D2D capable, the radio node may select a HD D2D mode for the D2D pair of wireless terminals. Alternatively or in addition, if the measured/reported discovery SINR exceeds a predefined threshold and/or the reported self-interference suppression does not reach a predefined threshold, the radio node selects HD D2D mode for the D2D pair of wireless terminals.

If the measured/reported path loss is above the said second threshold and/or the measured/reported discovery SINR is under a predefined threshold, the radio node selects cellular communication mode as the default mode for the wireless terminal pair.

In the case of initial mode selection 46 based on specific wireless terminal capability, the radio node performing mode selection uses one or more specific parameters associated with the wireless terminal capability for selecting the initial mode and/or the HARQ related parameters. An example of such parameter is the extent to which the UE can mitigate the self-interference. For example if the wireless terminal is capable of mitigating self-interference above a first threshold then the radio node selects the FD mode as the initial mode of operation for that UE. In a further example, if the wireless terminal is only capable of mitigating self-interference which is smaller than the first threshold, then the radio node may select the HD mode as the initial mode of operation for that wireless terminal.

In communications 48, the radio node transmits the determined (i.e. selected) mode to the other radio nodes. In this example, the base station 30 transmits the selected mode to the first and second wireless terminals. The mode selection may be a selection of FD or HD, and/or, a selection of cellular or D2D communication.

In this example, the first and second wireless terminals carry out communications 49 according to the selected mode. In this example, D2D communication between the first and second wireless terminals 20a,20b is started. The D2D communication uses resources according to the mode selection and/or resource allocation determination. Alternatively, the selected communication mode may be using the network node (e.g. cellular). In this case, the first and second wireless terminals communicate via the base station 30.

Figure 3:
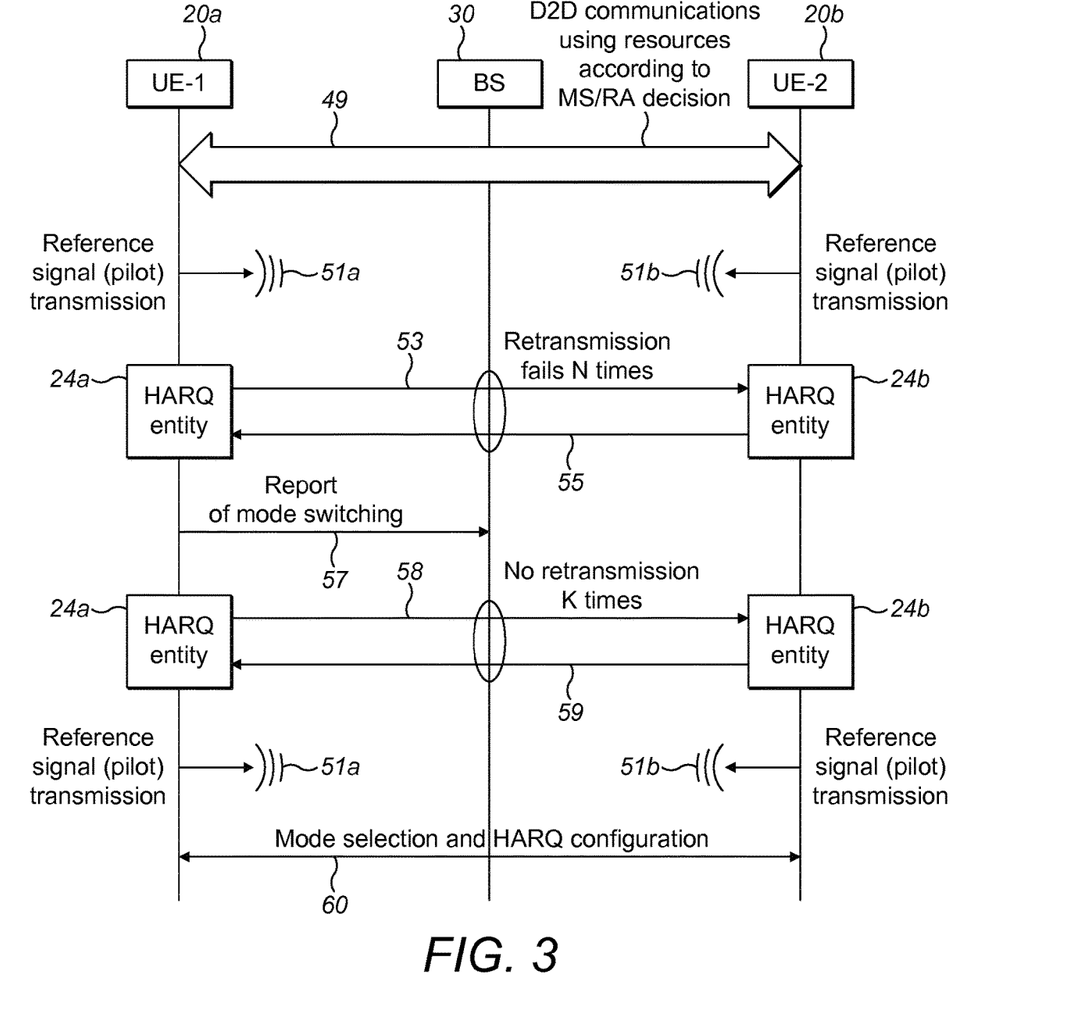
FIG. 3 shows an example of communications according to a further aspect of the disclosure.

FIG. 3 shows signaling and processes in an example of a HARQ Assisted Mode Selection, for nodes 20,30 in communication in the access network 10. In this method, the first and second wireless terminals 20a,20b report HARQ process results to enable the radio node to either reselect the communication mode or to allow the first and second wireless terminals to autonomously switch between HD and FD mode. When the radio node has sufficient statistics related to the HARQ retransmissions, then the radio node may perform mode switching or signal autonomous switching. In some examples, the HARQ process results are an indication of the maximum number of successful or failed HARQ retransmissions. Examples of different situations are now described.

Communication 49 corresponds to the example of FIG. 2, in which the first and second wireless terminal are in D2D communication. The following aspects are also applicable to an existing cellular communication between the first and second wireless terminal 20a,20b.

In a transmission 51a, the first wireless terminal transmits a reference signal or pilot signal. The reference signal may be received by the network node 30 and/or second wireless terminal 20b. Similarly, in a transmission 51b, the second wireless terminal transmits a reference signal or pilot signal. The reference signal may be received by the network node 30 and/or first wireless terminal 20a. In some examples, reference signals are transmitted periodically, for example, in a predetermined pattern. The reference signals are used by the network node 30 and/or second wireless terminal 20b for performing radio measurements e.g. path loss, signal strength, SINR. These measurements, in conjunction with HARQ retransmissions, are used for selecting between HD and FD communication modes of operation.

During communication, the first wireless terminal 20a transmits data using a HARQ entity 24a. A transmission or retransmission 53 from the first wireless terminal is responded to by a response transmission 55 from the second wireless terminal. The response transmission is either an acknowledgment that of receiving (ACK), or a response that the transmission was not successfully received (NACK). In the event of receiving a NACK response, the first wireless terminal 20a transmits a retransmission of all or a part of the transmission. The same principle of (re)transmission and acknowledgment is also applicable to transmissions from the second wireless terminal. In some examples, the transmissions 53,55 correspond to failed (re)transmissions. In this case, the communication mode may be changed to a more reliable communication mode, e.g. from FD to HD, as described below.

A determination to switch between FD mode and a HD mode, and/or between D2D mode and wireless access network mode, may be based on a number of HARQ retransmissions, and in particular, a number of failed HARQ retransmissions. For example, when operating in FD mode, if HARQ retransmissions fail N times, the radio node (e.g. containing HARQ entity) determines that communication is switched from FD to HD mode. An example of value of N is 4. The number of failed HARQ retransmissions may be for a same transmission, e.g. an initial (first) transmission. Alternatively, HD mode may be selected if a number of retransmission events is above a threshold, as described below.

The radio node may determine whether to select D2D mode or wireless access network mode. An example is described in the half-duplex mode; examples are also applicable to the FD mode. In this example, after selecting one of the two basic HD modes (i.e. HD D2D and HD cellular), the radio node switches the mode and may inform the other nodes, e.g. wireless terminal(s), about the new mode to be used.

In some examples, the selection and switching from FD to HD mode may also be based on one or more of the following criteria.

If the wireless terminal(s) is capable of only cellular communication, then the radio node selects HD cellular mode. The radio node may further determine that communication should be based on HD FDD or HD TDD cellular mode. Criteria used for determining between FDD and TDD may be as follows.

If the wireless terminal supports only one of the two duplex modes (HD TDD or HD FDD wireless access network mode), then the radio node selects the mode supported by the wireless terminal.

If the wireless terminal supports both duplex modes (HD TDD or HD FDD wireless access network), then the radio node selects one of the modes based on one or more further criteria. Examples of such criteria are spectrum availability, system load and interference.

For example, if the available spectrum is limited (e.g. only one carrier is available) then the radio node may select HD TDD wireless access network mode. If sufficient spectrum is available (e.g. 2 or more carriers), then the radio node may determine that HD FDD wireless access network mode of the wireless terminal is selected.

In another example, under high system load (e.g. if a number of wireless terminals per cell is above a threshold), the radio node may select HD TDD wireless access network mode. The radio node may distribute wireless terminals in the cell on different carriers; for example certain wireless terminals on a carrier having a frequency f1 and the remaining wireless terminals on a carrier having a frequency f2.

In another example, under high interference (e.g. uplink and/or downlink SINR is below their respective thresholds), the radio node may select HD TDD wireless access network mode for the wireless terminals.

If the wireless terminal is capable of only D2D operation, then the radio node selects HD D2D mode. Such D2D wireless terminal may typically be capable of maintaining communication link with the network node e.g. for resource assignment, power allocation etc. The radio node may further decide whether to select HD FDD or HD TDD D2D mode using the same mechanism as described above for the wireless access network mode.

If the wireless terminal is capable of cellular communication as well as D2D operation, then the radio node selects one of either D2D or wireless access network mode. In this example, the radio node has also selected HD mode; aspects are also applicable with a selection of FD mode. In this case the radio node may make the determination based on one or more criteria or parameter. The radio node may further decide whether to select to use FDD or TDD of the selected D2D mode or cellular mode. The determination of using FDD or TDD may be based on the same mechanism or criteria as described above. Examples of criteria for selecting between D2D and wireless access network modes, e.g. in an HD, communication are now described.

In one example, a determination of D2D or wireless access network communication, e.g. in a HD communication, is based on a number of HARQ retransmissions. For example, the determination of D2D or wireless access network communication mode is based on a number of failed HARQ retransmissions, e.g. within a particular time period. For example, the time period is a same initial (first) transmission for the same wireless terminal during a certain time period (T0) or number of frames e.g. within 10 frames. In some examples, the determination of D2D or wireless access network communication mode is based on a number of HARQ retransmission events A HARQ retransmission event may be considered as a predefined number, e.g. one or a plurality, of retransmission failures, e.g. at least N retransmission failures. In some examples, the retransmission failures defining an event are N successive retransmission failures. In an alternative, the retransmission failures are not required to be successive. In some examples, a retransmission event is determined for N retransmissions out of M total transmissions or N retransmissions over a defined time (e.g. T0). In some examples, the mode selection may be based on retransmission events which may or may not be required to be successive.

In some aspects, a parameter used to determine mode selection may be a number of HARQ transmissions, HARQ transmission failures and/or a number of transmission failure events, in which each event is a defined number of retransmission failures, e.g. within one or more defined period. The parameter may be compared to a threshold to determine the mode selection.

In some examples, mode selection may be carried out relatively quickly, i.e. based on a relatively short time period of measurements. For example, the determination made be carried out on a frame basis. In this case, the mode selection may be based on N retransmission failures. Alternatively or in addition, mode selection may be carried out based on a relatively long period of measurements. For example, the mode determination is based on a number of retransmission events, in which each event is defined by N retransmission failures. The N transmission failures of an event may be successive or not successive. In some examples, the mode selection may be based on retransmission events which may or may not be required to be successive. The mode is selected by comparing the number or frequency of events with a threshold. This provides for a more robust (albeit slower) mode selection, since the determination decision is based on more statistics.

In some examples, only retransmissions within a period T0 are counted for the parameter used to determine mode. This may be used when long term averaging affect (e.g. T0=200 ms) is used for selecting between modes. In this case retransmissions are not required to be successive. As such, a HARQ retransmission may be indicated as a HARQ retransmission failure event if retransmission fails at least N times. The retransmission event may be defined as a number of HARQ retransmission failures within a first time period T1 which is greater than a threshold number.in some examples, the parameter used for mode selection is for a same transmission to the same wireless terminal. In some examples, the retransmission event is a number of HARQ retransmission failures in a certain period (T1). If there are more than M such indicated retransmission failure events within a different, second, time period (T0), then the radio node determines to switch mode of operation, e.g. between D2D and cellular modes.

In some examples, the number of indicated HARQ retransmissions failures or retransmission events is compared to a threshold M. When the number of indicated HARQ retransmission failures or retransmission events is determined to be below (or equal) to the threshold, the radio node selects D2D. As above, a HARQ retransmission event is indicated by N (optionally successive) HARQ retransmission failures. For example if M≤2 over during the time period T0, then the radio node selects D2D mode (e.g. in HD mode). When the number of HARQ retransmissions is determined to be above the threshold, the radio node selects wireless access network mode as the mode of operation. For example, for M>2 over the time period T0, the wireless access network mode (e.g. in HD mode). is selected.

In a further example, when the radio node determines that the mode should switch from FD to HD, the D2D or wireless access network mode selection is not changed. For example, for a mode change from FD D2D to HD (as determined according to the criteria described above, the HD mode operates using D2D communication. Correspondingly, for a mode change from FD cellular to HD, the HD mode operates using cellular communication. Thus, a same one of the D2D or cellular mode is used when switching a mode from FD to HD.

For example, for a wireless terminal which is configured with a FD D2D mode and if HARQ retransmissions fail N times, e.g. for the same initial (first) transmission, then the radio node switches from FD mode to HD mode, and additionally selects (i.e. maintains) D2D mode. Correspondingly, if the wireless terminal is configured with FD wireless access network mode, and if HARQ retransmissions fail N times for the same initial (first) transmission, then the radio node switches from FD mode to HD mode, and additionally selects (i.e. maintains) wireless access network mode.

Alternatively, mode selection is based on if the HARQ retransmissions are determined to satisfy a criteria based on the number of HARQ retransmissions, for example as described above. In some examples, the measurements to determine a switch between D2D and wireless access network communication mode over a longer time period than used for determining a switch between FD and HD. Once a determination is made, then the radio node may change the mode to the other of D2D and wireless access network communication mode.

In some examples, the mode determination is made by comparing a measurement of HARQ retransmission (failures) during a certain time period with a threshold. The number of HARQ retransmission fails may be the number of times (M) or a number of events (M) of a preconfigured number (N) of fails. For example, the mode may be switched if a determination of a failure N times successively M times or M times during the time period (T0). In some examples, the radio node may change the mode to the other of D2D and cellular. For example, the mode is changed from D2D to wireless access network mode, or from wireless access network mode to D2D. This is at the same time as the mode change from FD to HD. For example, if the number of HARQ retransmission (failures) or events is above a threshold, the switch may be from D2D mode to wireless access network mode.

In some aspects, the determination of switching from FD to HD mode, as described above, may be based on further input information or criteria. For example, the determination may be based on a selected modulation and coding scheme (MCS). In a further example, the determination may be based on a reference signal (pilot) measurements, for example, channel quality indicators (CQI), BLER, SINR, SNR sidelink RSRP (SNR S-RSRP), sidelink RSRQ (S-RSRQ), or any other measurement.

For example, when the first and second wireless terminals communicate with a low rate (i.e. robust) MCS and the number of HARQ retransmissions exceeds a certain threshold, a determination may be made to switch from FD mode to HD mode or between D2D mode and wireless access network mode (e.g. from D2D to wireless access network mode). In some examples, the determination may be made by the first and second wireless terminals. The first and second wireless terminals may request the network node to make such a mode switch. Alternatively, if the number of HARQ retransmissions exceeds a certain threshold when a high rate MCS mode is being used, then a determination is made to switch to a more robust MCS mode. In this example, a switch in communication mode is not made.

The first wireless terminal $20a$ is configured to transmit a report 57 to the network node 30. The report 57 may comprise information, for example relating to HARQ retransmissions, to allow the network node to select a communication mode. Alternatively, the report 57 may be information of a communication mode which has been selected autonomously by the wireless terminal $20a$. The second wireless terminal $20b$ may alternatively or additionally transmit any example of report (not shown).

Aspects of the disclosure further provide for a switch in operation mode from HD to FD based on a measurement of HARQ retransmissions. In this example, the measurement of HARQ retransmissions indicate good radio communication is possible, allowing for FD communication. For example, a switch to FD mode is made when a measured number of HARQ retransmission failures is below a threshold.

In an example communication, the first wireless terminal $20a$ transmits further data in transmissions 58 using the HARQ entity $24a$. As above, the transmissions 58 from the first wireless terminal is responded to by a response transmission 59 from the second wireless terminal. In this example, the transmissions 58,59 correspond to successful transmissions. In this case, the communication mode may be changed to a higher capacity communication mode, e.g. from HD to FD, as described below. In some examples, the first wireless terminal $20a$ is configured to transmit a report (not shown), corresponding to any example of report 57, to the network node 30. In this example, the report indicates that HARQ retransmissions have not been performed and/or that a mode determination has been made by the wireless terminal.

For example, when operating in HD, if HARQ retransmissions have not happened or the HARQ re-transmissions have not exceeded a threshold K times (e.g. to be defined as a retransmission event, for example the same initial (first) transmission, then the FD mode is selected by the radio node. An example of the value of K is 2. Alternatively, FD mode may be selected if a number of retransmission events is below a threshold.

In addition to the selection of FD, the radio node may further determine whether to select D2D mode or wireless access network mode. After selecting one of the two basic FD modes (i.e. FD D2D or FD wireless access network), the radio node switches the mode and may inform the wireless terminal(s) about the new mode to be used. In some examples, this selection and switching from HD to FD modes is additionally based on the following aspects.

If the wireless terminal(s) is capable of only wireless access network communication (i.e. not D2D), then the radio node selects FD wireless access network mode.

If the wireless terminal(s) is capable of only D2D operation (i.e. not wireless access network communication) then the radio node selects FD D2D mode. Such FD D2D wireless terminal(s) may typically be capable of maintaining a communication link with the network node e.g. for resource assignment, power allocation etc. Data is communicated by a D2D communication mode.

If the wireless terminal(s) is capable of FD wireless access network communication as well as FD D2D operation, then the radio node is able to select either FD D2D or FD wireless access network mode. In this case, the radio node may select one of the two FD modes based on one or more criteria. Example criteria for selecting between FD D2D and FD wireless access network modes are now described. In some examples, such criteria may correspond to the mode selection in HD as described above; although the threshold values and parameters used may differ.

An example criterion is based on a number of HARQ retransmissions. For example, the determination of D2D or wireless access network communication mode is based on a number of failed HARQ retransmissions, e.g. within a particular time period. For example, the time period is a same transmission, e.g. an initial (first) transmission for the same wireless terminal. In some examples, the measurements are during a particular time period (T2), or a number of frames e.g. within 10 frames. The time period may be the same or different than used in HD mode. In some examples, the determination of D2D or wireless access network communication mode is based on a number of HARQ retransmission events. A HARQ retransmission event may be considered as a predefined number, e.g. one or a plurality, of retransmission failures, e.g. at least one or more (K) retransmission failures. In some examples, the retransmission failures defining an event are a plurality of retransmissions, e.g. K successive retransmission failures. In an alternative, the plurality of retransmission failures are not required to be successive.

In some examples, the mode selection may be based on retransmission events which may or may not be required to be successive. A parameter may be defined as a number of such HARQ retransmission events, e.g. in the defined time period. A mode selection is made based on a comparison of the parameter with a threshold. If the number of HARQ transmissions or retransmission failures or retransmission events is less than a threshold, then a mode selection is made (e.g. D2D). If the number of HARQ transmissions or retransmission failures or retransmission events is more than the same or a different (e.g. higher) threshold, then a mode selection is made (e.g. wireless access network mode).

For example, the mode selection may be based on a number of times (P) the HARQ retransmissions have not exceeded K times, e.g., for the same initial (first) transmission for the same wireless device during a certain time period (T2) e.g. within 15 frames. For example, if the number of times P is less than (or equal to) a threshold, then D2D mode is selected. If the number of times P is more than a threshold, the wireless access network mode (i.e. FD wireless access network mode) mode is selected. In some examples, the threshold with which K is compared is 2 or 3. A number of retransmissions K (e.g. in a certain time or successively) above the threshold indicates a retransmission event.

In a further example, when the radio node determines that the mode should switch from HD to FD, the D2D or wireless access network mode selection is not changed. For example, for a mode change from HD D2D to FD (as determined according to the criteria described above, the FD mode operates using D2D communication. Correspondingly, for a mode change from HD cellular to FD, the FD mode operates using wireless access network mode communication. Thus, a same one of the D2D or wireless access network mode is used when switching from HD to FD.

For example, for a wireless terminal which is configured with a HD D2D mode and if HARQ retransmissions have not exceeded K times for the same initial (first) transmission then the radio node selects FD D2D mode. Correspondingly, if the wireless terminal is configured with HD wireless access network mode, and if HARQ retransmissions have not exceeded K times, e.g., for the same initial (first) transmission, then the radio node selects FD wireless access network mode.

Alternatively, if the HARQ retransmissions do not exceed K successively P times or P times during a defined time period (T3) then the radio node may change the mode between D2D and wireless access network mode. For example, the mode is changed from D2D to wireless access network mode, or from wireless access network mode to D2D. This is at the same time as the mode change from HD to FD.

The step of switching from HD to FD modes can further use other inputs such as selected MCS, reference signal (pilot) measurements like CQI, BLER, SINR, SNR S-RSRP, S-RSRQ etc. For example if selected MCS scheme exceeds a threshold (e.g. 16QAM, code rate above ½) then it is interpreted as sufficient channel conditions to select FD D2D mode or FD cellular mode.

In some aspects, the determination of switching from HD to FD mode, as described above, may be based on further input information or criteria. For example, the determination may be based on a selected modulation and coding scheme (MCS). In a further example, the determination may be based on a reference signal (pilot) measurements, for example, CQI, BLER, SINR, SNR sidelink RSRP (SNR S-RSRP), sidelink RSRQ (S-RSRQ), or any other measurement. For example, if a selected MCS scheme exceeds a threshold (e.g. 16QAM, code rate above ½) then it is interpreted as sufficient channel conditions to select a FD mode instead of HD. In some examples, mode selection is based on a comparison of a parameter with a first threshold K and a second threshold N. The parameter may be the number 'L' of HARQ retransmissions, for example, for the same initial (first) transmission. The first threshold K and second threshold N are different. For example, the second threshold is higher. In some examples, the first threshold K and the second threshold N are separated (e.g. non-consecutive for an integer parameter), such that the parameter L may have a value between the first and second thresholds.

As described above, if the parameter is lower than the first threshold K, then the HARQ performance may be considered as good, and the mode changed accordingly. If the parameter is higher than the second threshold N, then the HARQ performance may be considered as poor, and the mode changed accordingly. If the parameter L is between the first and second thresholds, then the HARQ performance may be considered as moderate. In this case, the radio node may not perform mode selection or select a specific mode.

Alternatively, a mode selection may be determined, according to one of the following examples.

In an example of the parameter being determined to be between the first and second thresholds, the radio node determines not to change the current mode of the wireless terminal(s). For example, if the wireless terminal(s) is operating in FD cellular mode and if the number of HARQ retransmissions for the same initial (first) transmission is between the first and second thresholds, then the radio node retains the FD cellular mode for that UE. In this case, K<L<N.

In a further example of the parameter being determined to be between the first and second thresholds, the radio node determines mode selection in a specific (e.g. predetermined) manner. For example, if the number of HARQ retransmissions is between the first and second thresholds, then the mode selection may be to maintain the same mode selection of either FD or HD. The mode selection may further be to be change the mode selection of D2D or wireless access network mode communication. Thus, current D2D is changed to wireless access network mode, and current wireless access network mode is changed to D2D mode. The aspect of FD or HD mode selection is not changed.

These mode selections may be considered as:
switch to FD wireless access network (cellular) mode if the wireless terminal was operating in FD D2D mode;
switch to HD wireless access network (cellular) mode if the wireless terminal was operating in HD D2D mode;
switch to FD D2D mode if the wireless terminal was operating in FD wireless access network (cellular) mode;
switch to HD D2D mode if the wireless terminal was operating in HD wireless access network (cellular) mode.

In some examples, the value of K may be 2, and/or the value of N may be 4. In this example, a value of L of 3 would be between the first and second thresholds. Alternatively, the first and second thresholds K and N may be selected to be the same or spaced such that L cannot take a value which is not considered as satisfying either the first or second threshold. For example, a value of K may be 3, and/or the value of N may be 4. In this case, the parameter L either meets the first threshold (e.g. equal to or lower than the first threshold) or meets the second threshold (e.g. equal to or higher than the second threshold). The mode is therefore effectively selected from the two options of the parameter L (number of transmissions), being above or below a single threshold.

One or more mode selection communications 60 are transmitted from the radio node making the mode selection to the other nodes, e.g. to one or more of the first wireless terminal, second wireless terminal and the network node. This communication 60, signalling, is to the wireless terminal and/or one or more further nodes. The signalling indicates the determined mode of operation for the wireless terminal. For example, when the network node 30 makes the mode selection determination as the radio node, the network node transmits a mode selection communication 60 to the first and second wireless terminals 20a, 20b. The mode selection communication 60 indicates the mode (e.g. HD or FD and/or wireless access network mode or D2D mode) to be used.

In some examples, the mode switching between FD and HD, and/or between D2D and wireless access network mode, based on number of HARQ retransmissions (or transmission events comprising a plurality of HARQ retransmissions), can be implemented to avoid overly rapid alternating between modes. For example, a timer, event, radio measurement and/or configuration of hysteresis values of the thresholds may be used to avoid repeatedly alternating states in quick succession (i.e. Ping-Ponging) between FD D2D or FD wireless access network mode and HD D2D or HD wireless access network mode. For example, switching from HD to FD operation, in addition to the counter based criterion above, a further criteria requires that the wireless terminal pair (e.g. in D2D communication) has been communicating in HD mode for at least $T_{HD}$ seconds (i.e. use of a timer), and/or during this period the measured and/or reported D2D path loss (i.e. a radio measurement) has not exceeded a predefined path loss threshold ($PL_{FD}$).

In some examples, the mode switching between FD and HD based on HARQ can be performed or controlled autonomously by a wireless terminal sending HARQ feedback. This aspect may apply for any type of wireless terminal i.e. a wireless terminal capable of cellular communication and/or D2D operation. In this case the radio node is the wireless terminal. As such, the wireless terminal makes the determination of mode selection. The mode selection is autonomous by the wireless terminal, i.e. without receiving signaling from the base station to implement a particular mode selection. In some examples, the wireless terminal transmits a signal to the base station to inform the network of the selected mode.

In this case of the wireless terminal determining the mode, the network node (e.g. base station) may still indicate to the wireless terminal(s), which radio resources are to be used for FD and which radio resources are to be used for HD operation. The radio resources indicated may be physical radio resource, e.g. physical channel resources, for example, resource blocks, resource elements, time slots, subframes or other radio resources. In this case, the network node provides a scheduled allocation of resources for the wireless terminals. In some examples, these resources are indicated to the wireless terminals in advance (a priori) or independently of the mode selection determination. In some aspects, this resource allocation is carried out by the network node when the network node is determining the mode selection.

In some examples, the network node (e.g. base station) is responsible for resource allocation for HD or FD modes on a coarse time scale (e.g. approximately 500-1000 ms). In this case the mode selection between FD and HD mode is also done on a coarser time scale. A finer time scale mode selection between FD and HD mode is done by the devices e.g. wireless terminal, or wireless terminal D2D pair involved in D2D operation. In this case the resource allocation for HD or FD modes are also done or updated on finer time scale. Examples of finer time scales for mode selection between FD and HD mode are one radio frame (e.g. 10 ms), or Q+1 number of subframes, where Q is the total number of allowed HARQ retransmissions for the same initial retransmissions.

In a further example, a mode selection 60 for a first wireless terminal is determined by a second wireless terminal. For example, the second wireless terminal is a peer wireless terminal. The first and second wireless terminals may be in, or will be in, D2D communication. This example may optionally apply for a wireless terminal capable of operating, or determined to operate, only in a D2D mode of operation. In this case, the radio node is the D2D UE. In some aspects, one of the D2D wireless terminal uses its own D2D and/or received D2D radio measurements as an input to the mode selection determination. For example, the mode determination is based on a path gain and/or received signal strength measurement. For example, the mode determination is based on a detected a D2D path gain or signal strength which exceeds a preconfigured threshold.

In this case, either of the wireless terminals of a D2D pair of wireless terminals sends an explicit mode switching transmission to a network node (e.g. base station). The mode switching transmission may be a request for a change in communication mode. In some examples, the mode switching transmission includes an explicit requested communication mode to be used. In this example, the network node responds to the wireless terminal with a transmission indicating the mode to be used (e.g. HD/FD and/or wireless access network/D2D), or responds with a confirmation or refusal that operation in the requested communication mode can be used by the wireless terminals. For example, if the wireless terminal recommend or request a mode then the network node can accept or reject the wireless terminal request.

In a further example, a mode selection 60 for a wireless terminal is determined by a network node, for example, a cellular base station, which is controlling D2D operation. In this case, the radio node is the network node. In this case, the HARQ entities of the network node provide a report and explicitly request mode switching to a mode switching entity within the network node. The HARQ entities may provide HARQ measurements and other measurement statistics, and await network node approval of the requested communication mode.

In a further example, a mode selection 60 for a wireless terminal is determined by a mutual communication between any two or more of the above devices. In this case, the radio node may be considered as both the wireless terminal and the network node i.e. both nodes are involved in determining the final mode. In particular, the network node selects the final mode (which may be termed a composite mode) to be used by the wireless terminal by combining the results of a mode determined by the network node itself and the mode determined by the wireless. For example, the wireless terminal may determine a mode as described in any example above, as a recommended mode.

The wireless terminal may send a message to the network node with an indication of the recommended mode. The network node may also determine the mode based on any example above. The network node determines the actual mode selected (i.e. composite mode) based on the wireless terminal recommended mode and a mode determined by the network node. The final, actual, determination is described below as made by the radio node, which may be the base station (network node) or any other node(s) as described above. The actual selected mode may be determined from the two determined modes using one or more of the following criteria.

If the mode recommended by the wireless terminal is the same as the mode determined by the network node, then the radio node will select this mode. The mode selection comprises a selection between HD and FD, and/or comprises a selection between cellular and D2D communication.

If the mode recommended by the wireless terminal is different to the mode determined by the network node, then the radio node may select the mode to be used by the UE using any one of the following examples. The mode selection comprises a selection between HD and FD, and/or comprises a selection between cellular and D2D communication. In one example, the radio node may discard the mode determined by the network node, and select the mode which is determined by the wireless terminal.

In a further example, the radio node may discard the wireless terminal recommended mode, and selects the mode which is determined by the network node.

In yet another example, the radio node may select the mode which would lead to a least number of HARQ retransmissions. For example, the radio node selects a cellular mode if the determined modes by the two entities are cellular and D2D modes. In this example, the HD/FD mode selection may be the same for both the initially determined modes, and the actual selected mode, e.g. HD modes. The wireless access network mode is typically more reliable than the D2D mode. Therefore, mode selection is based on a comparison of a number of HARQ retransmissions or retransmission events with one or more thresholds. A measured number of retransmissions or events above a threshold determines a switch to wireless access network (e.g. cellular) mode, below the same or a different threshold determines a switch to D2D mode.

In yet another example, the radio node may select the mode which is more reliable or conservative. For example, a HD mode is considered to be more conservative than FD. The more conservative mode may be considered as the mode which would lead to a fewer number of HARQ retransmissions. For example, the radio node selects a HD mode if the determined modes by the two entities are HD and FD modes. This determination is independent of the wireless access network/D2D mode selection.

In yet another example, the radio node may select the mode which is more aggressive (e.g. provides for a higher data rate). For example, the radio node selects a FD mode if the wireless terminal and network node determined modes are HD and FD modes. A FD mode is considered to be more aggressive (allow a higher data rate) than HD In some aspects, one or more parameters of the HARQ entity, such as timers and number of retransmissions, mode switching parameters (e.g. N, K, $T_{HD}$, $PL_{FD}$) are reconfigured or reset when switching between FD and HD mode. Thus, there is a mutual interplay between FD/HD mode selection and HARQ configuration. As described above, the mode switching is associated with a number of thresholds and other parameters. For example, the mode switching may be based on the measured radio characteristic between the D2D peer entities and/or between the D2D pair and the network node, and/or a radio characteristic of the wireless terminal(s) and/or network node. For example, the measured radio characteristic may be a measured path gain and/or measured total signal strength at the D2D receiver and/or network node, full duplex self-interference suppression capability, maximum transmit power level and supported communication bandwidth. One or more of the parameters used in the mode selection are configured by a network node and/or, configured by a peer D2D wireless terminal in case of D2D operation.

Figure 4:
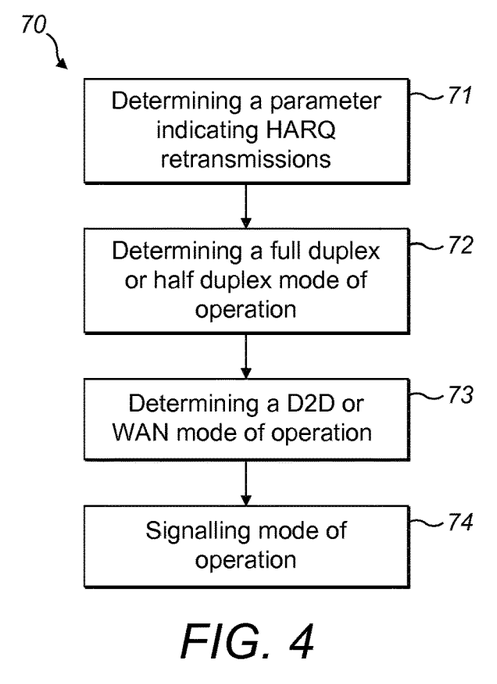
FIG. 4 shows an example method according to an example of the disclosure.

FIG. 4 shows an outline method 70 of aspects of the disclosure. This method is implemented in the radio node, which may be located in the network node, the wireless terminal being configured, or in a further wireless terminal. The further wireless terminal may implement the method for a wireless terminal with which it is, or will be, in D2D communication. The method is for determining a mode of operation for a wireless terminal. In some examples, the wireless terminal communicates with a radio access network. In some examples, the wireless terminal is capable of D2D communication and/or cellular communication with a network node of the radio access network.

In 71, the method determines a parameter indicating HARQ re-transmissions in communications with the wireless terminals. The parameter is, or is based on, a number of HARQ re-transmissions. In some examples, the parameter indicating HARQ re-transmissions is, or is a based on, a number of indicated retransmission events, wherein a retransmission event is indicated by a plurality of HARQ re-transmission failures. The plurality of HARQ re-transmission failures may be a plurality of successive HARQ re-transmission failures. The retransmission event is indicated by a configured number of such transmission failures being measured. The determining may comprise determining one or more parameter based on number of HARQ re-transmissions.

In 72, the method determines a full duplex or half duplex mode of operation based on the parameter of HARQ re-transmissions. This mode of operation is intended to be used by the wireless terminal and/or network node.

In 73, the method determines a device-to-device mode or wireless access network (WAN) mode of operation for the wireless terminal. The device-to-device mode or wireless access network mode of operation is based on the same or different parameter indicating HARQ re-transmissions, and/or on one or more other criteria as described. The parameter used for determining the device-to-device mode or wireless access network mode of operation may be the same parameter(s) or different parameter(s) and/or same or different threshold, than the parameter and/or threshold used for determining a full duplex or half duplex mode of operation.

In 74, the method further comprises signalling to the wireless terminal and/or one or more further nodes an indication of the determined mode of operation for the wireless terminal. The signalling may be from the radio node determining the mode of operation to all other nodes which are to use that mode of operation. The nodes using the mode of operation may be one or more of the network node, and first and/or second wireless terminals.

Figure 5:
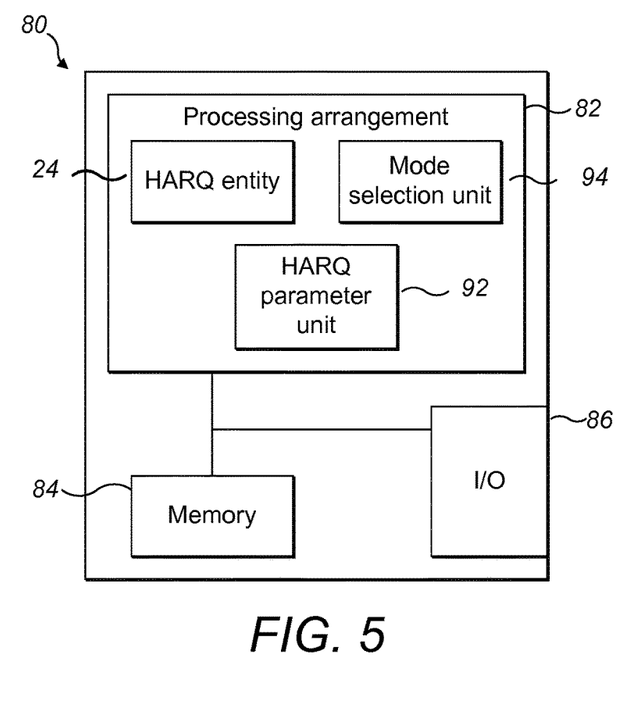
FIG. 5 shows an example apparatus according to an example of the disclosure.

FIG. 5 shows an example apparatus 80. The apparatus 80 indicates functional modules or units or a radio node as described above. As such, the apparatus 80 may be implemented in a network node or a wireless terminal.

The apparatus 80 comprises a processing arrangement 82, comprising one or more processors. The processing arrangement is functionally connected to a memory 84 and an I/O unit 86. For example, the I/O unit 86 may comprise radio circuitry for RF communication in a radio access network.

The processing arrangement 82 and/or memory 86 may be configured to implement the functionality described. For example, the memory may be considered as storing/containing instructions that when executed cause the apparatus to perform the method of any example. These functions may be considered as functional modules implemented by the processing arrangement 82. For example, the apparatus may be considered as comprising a HARQ entity 24, configured to handle HARQ retransmissions. The apparatus 80 may further comprise a HARQ parameter unit 92, configured to determine a HARQ parameter, e.g. a number of HARQ retransmissions or retransmission events. In some examples, the HARQ parameter unit 92 receives a signal indicating a HARQ retransmission, and processes this signal according to the process described to allow a mode selection. In some examples, the HARQ parameter unit 92 receives a signal indicating a HARQ retransmission from the same processing arrangement 82 as the HARQ entity 24, or from a different processing arrangement, e.g. in a different node.

The apparatus 80 may further comprise a mode selection unit 94. The mode selection unit 94 receives one or more HARQ parameter values and/or other measurements, and determines the mode selection. For example, the mode selection unit 94 determines if the mode is HD/FD and/or D2D/network communication. The mode selection unit 94 is configured to output the selected mode to the apparatus 80 and other nodes using the selected mode, e.g. the wireless terminal(s) or network node in communication with the node comprising the radio node.

A further example of the disclosure is a computer program product comprising a non-transitory machine-readable medium carrying instructions which, when executed by a processor, cause the processor to perform the method of any example.

Aspects of the disclosure provide for a mode selection, based on a determination of the wireless communication channel. The wireless communication channel may be indicated at least partly by HARQ retransmissions. The mode determination may be half-duplex D2D, full duplex D2D, HD wireless access network or FD wireless access network modes for full duplex or HD capable devices. The mode selection may be applicable to the wireless terminal, one or more wireless terminal (e.g. in D2D communication with the wireless terminal), and/or one or more network nodes.

The access network has been described as a cellular network. Alternatively, the access network may be based on non-cellular technology. For example, the network is a WLAN network, for example, based on IEEE 802.11, e.g. Wi-Fi.

Any example described may be used in combination with any other example of the disclosure.

In some examples, the mode selection is based on one or more parameter of HARQ re-transmissions. The parameter may be a number of of HARQ re-transmissions or a number of of HARQ re-transmission events. The HARQ re-transmission events may comprise one or more retransmissions. The retransmissions of an event may be successive retransmission (e.g. retransmission failures) or may not be successive retransmissions. The mode selection between FD/HD and/or wireless access network/D2D mode may be based on the same parameter or different HARQ retransmission parameters, and/or one or more further parameters or information relating to the nodes or channel. The thresholds used for mode selection between FD/HD may be different to those used for mode selection between wireless access network/D2D mode. In some aspects, the mode selection is based on HARQ retransmissions or HARQ retransmission failures.

Any example may be used in combination with any other example described. In some aspects, any example described for selection between FD and HD modes is applicable to mode selection between D2D and wireless access network modes, and vice versa.

ABBREVIATION EXPLANATION

A-GNSS Assisted GNSS
AP Access point
AS Application server
BS Base Station
BTS Base Transceiver Station
DAS Distributed Antenna Systems
D2D Device-to-Device
FD Full Duplex
FDD Frequency Division Duplex
FD-E-PHR Full Duplex Extended Power Headroom Report(ing)
GNSS Global navigational satellite system
HD Half Duplex
LEE Laptop Embedded Equipped
LME Laptop Mounted Equipment
MS Mode Switching
MCS Modulation and Coding Scheme
M2M Machine-to-Machine
NW Network
OTDOA Observed time difference of arrival
PCRF Policy Control and Resource Function
PDA Personal Digital Assistant
PDCCH PHY Downlink Control Channel
PH Power headroom
PHR PH reporting
PHY Physical
PRB PHY resource block
QoS Quality of Service
RA Resource Allocation
RAN Radio Access Network
SINR Signal to Interference Plus Noise Ratio
SSIR Signal to Self-Interference Ratio
TDD Time Division Duplex
UE User Equipment
USB Universal Serial Bus

The invention claimed is:

1. A method of determining a mode of operation, from a plurality of modes of operation, for a wireless terminal, the method comprising:
   determining a parameter indicating Hybrid Automatic Repeat Request, HARQ, re-transmissions in communications with the wireless terminal, wherein the parameter indicating HARQ re-transmissions is a number of HARQ re-transmissions,
   determining a full duplex or half duplex mode of operation based on the number of HARQ re-transmissions, the number of HARQ re-transmissions being compared to a threshold for determining the mode of operation,
   determining a device-to-device mode or a wireless access network mode of operation for the wireless terminal, based on the number of HARQ re-transmissions, the wireless terminal being configured for device-to-device communication, the method being implemented in a network node and the wireless terminal, the network node and the wireless terminal each determining a mode of operation based on the parameter of HARQ retransmissions, and the mode of operation being selected based on a combined result of the determined mode of operations from both of the network node and the wireless terminal, the plurality of modes of operation being full duplex, half duplex, device-to-device, and wireless access network mode; and
   avoiding interference, the avoiding interference corresponding to the determining the full duplex or half duplex mode of operation based on the number of HARQ re-transmissions and the determining the device-to-device mode or the wireless access network mode of operation for the wireless terminal, based on the number of HARQ re-transmissions.

2. The method according to claim 1, further comprising signalling to the wireless terminal and/or a network node and/or a further wireless terminal an indication of the determined mode of operation for the wireless terminal.

3. The method according to claim 1, wherein determining the mode of operation comprises determining a half duplex mode of operation if the parameter indicating HARQ re-transmissions is above a threshold.

4. The method according to claim 1, wherein determining the mode of operation comprises determining a full duplex mode of operation if the parameter indicating HARQ re-transmissions is below a threshold or below a further threshold.

5. The method according to claim 1, wherein the parameter indicating HARQ re-transmissions is also based on a number of indicated retransmission events, wherein a re-transmission event is indicated by a plurality of HARQ re-transmission failures and the number of indicated re-transmission events is further used to determine the mode of operation.

6. The method according to claim 1, wherein the method is implemented in a network node, wherein determining the parameter indicating HARQ re-transmissions comprises receiving the parameter from the wireless terminal.

7. The method according to claim 1, wherein the method is implemented in the wireless terminal or a further wireless terminal, wherein the determining the parameter indicating HARQ re-transmissions comprises measuring HARQ retransmissions to generate the parameter for the wireless terminal.

8. The method according to claim 1, wherein an initial mode of operation is based on one or more capabilities of the wireless terminal associated with the device-to-device mode or the wireless access network communication mode and/or based on a radio measurement performed by the wireless terminal.

9. A computer program product comprising a non-transitory machine-readable medium carrying instructions which, when executed by a processor, cause the processor to perform the method of claim 1.

10. The method according to claim 1, wherein the determined mode of operation is one of: a full duplex device-to-device mode, a half duplex device-to-device mode, a full duplex wireless access network mode, and a half duplex wireless access network mode.

11. An apparatus configured to determine a mode of operation, from a plurality of modes of operation, for a wireless terminal, the apparatus comprising:
a HARQ parameter unit configured to determine a parameter indicating Hybrid Automatic Repeat Request, HARQ, re-transmissions in communications with the wireless terminal, wherein the parameter indicating HARQ re-transmissions is a number of HARQ re-transmissions, and
a mode selection unit configured to determine a full duplex or half duplex mode of operation based on the number of HARQ re-transmissions, the number of HARQ re-transmissions being compared to a threshold for determining the mode of operation,
the mode selection unit being further configured to determine a device-to-device mode or a wireless access network mode of operation for the wireless terminal, based on the number of HARQ re-transmissions,
the wireless terminal being configured for device-to-device communication, the wireless terminal being configured to determine a mode of operation based on the parameter of HARQ retransmissions, and the mode of operation being selected based on a combined result of the determined mode of operations from the wireless terminal, the plurality of modes of operation being full duplex, half duplex, device-to-device, and wireless access network mode, and
the wireless terminal being configured to avoid interference, the avoiding interference corresponding to the determining the full duplex or half duplex mode of operation based on the number of HARQ re-transmissions and the determining the device-to-device mode or the wireless access network mode of operation for the wireless terminal, based on the number of HARQ re-transmissions.

12. The apparatus according to claim 11, wherein the apparatus is a wireless terminal or the apparatus is a network node.

13. The apparatus according to claim 11, wherein the parameter indicating HARQ re-transmissions is also based on a number of indicated re-transmission events,
wherein a re-transmission event is indicated by a plurality of HARQ re-transmission failures, and the number of indicated re-transmission events is further used to determine the mode of operation.

14. The apparatus according to claim 11, wherein the determined mode of operation is one of: a full duplex device-to-device mode, a half duplex device-to-device mode, a full duplex wireless access network mode, and a half duplex wireless access network mode.

15. An apparatus configured to determine a mode of operation, from a plurality of modes of operation, for a wireless terminal, the apparatus comprising a processing arrangement and a memory, said memory containing instructions that when executed cause the apparatus to:
determine a parameter indicating Hybrid Automatic Repeat Request, HARQ, retransmissions in communications with the wireless terminal, wherein the parameter indicating HARQ re-transmissions is a number of HARQ re-transmissions,
determine a full duplex or half duplex mode of operation based on the number of HARQ re-transmissions, the number of HARQ re-transmissions being compared to a threshold for determining the mode of operation, and
determine a device-to-device mode or a wireless access network mode of operation for the wireless terminal, based on the number of HARQ re-transmissions, wherein the wireless terminal is configured for device-to-device communication, the wireless terminal being configured to determine a mode of operation based on the parameter of HARQ retransmissions, and the mode of operation being selected based on a combined result of the determined mode of operations from the wireless terminal, the plurality of modes of operation being full duplex, half duplex, device-to-device, and wireless access network mode, and
avoid interference, the avoiding interference corresponding to the determining the full duplex or half duplex mode of operation based on the number of HARQ re-transmissions and the determining the device-to-device mode or the wireless access network mode of operation for the wireless terminal, based on the number of HARQ re-transmissions.

16. The apparatus according to claim 15, wherein the determined mode of operation is one of: a full duplex device-to-device mode, a half duplex device-to-device mode, a full duplex wireless access network mode, and a half duplex wireless access network mode.

* * * * *